Patented Apr. 18, 1933

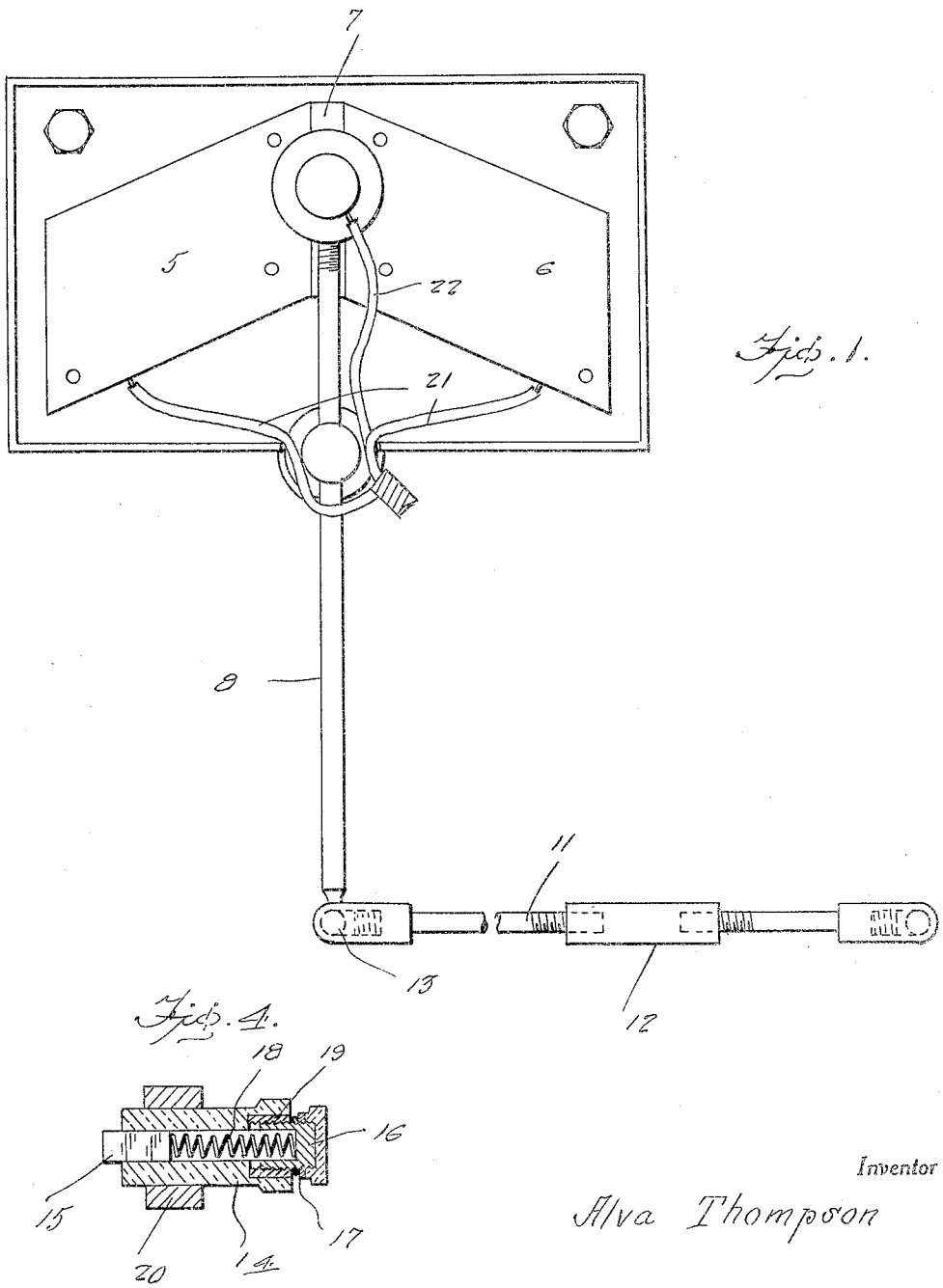

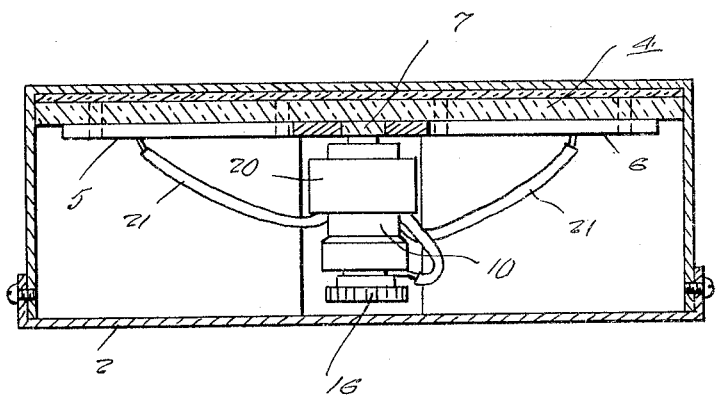
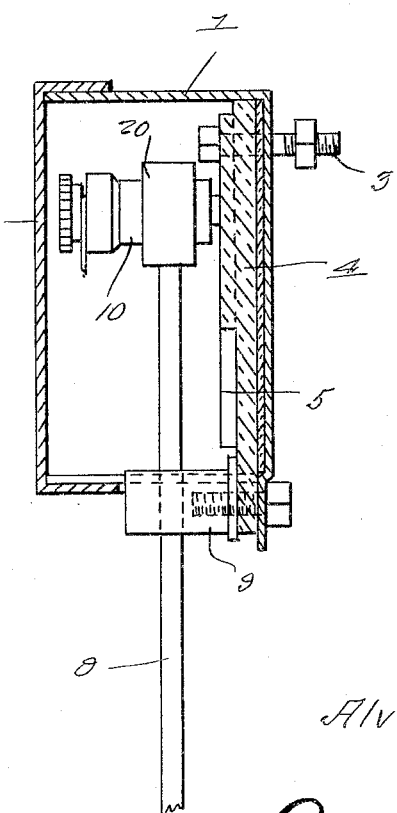

1,904,806

UNITED STATES PATENT OFFICE

ALVA THOMPSON, OF LOS ANGELES, CALIFORNIA

AUTOMATIC DIRECTION SIGNAL SWITCH

Application filed December 18, 1931. Serial No. 581,971.

This invention relates to improvements in switches, which are mainly designed for directional signals on automobiles and the like, the general object of the invention being to provide a pivoted arm having a brush at one end thereof with means for connecting the other end of the arm to a steering arm or connecting rod of a motor vehicle, and a pair of contact plates over which the brush operates, the plate being electrically connected to the signal means for indicating when the vehicle is to be turned to the right or left.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a view of the invention with the lid of the casing thereof removed.

Fig. 2 is a longitudinal sectional view through the device.

Fig. 3 is a transverse sectional view.

Fig. 4 is a sectional view through the brush.

In these drawings, the numeral 1 indicates a casing which is closed by a removable cover 2, the casing being adapted to be connected to any suitable part of a vehicle by the bolts 3. A plate 4 of non-conductive material is located in the casing, and a pair of diverging contact plates 5 and 6 are fastened to the plate 4 and are spaced apart by a strip 7 of non-conducting material.

An arm 8 is pivotally supported on a part of the casing, by the pivot means shown generally at 9, and a portion of said means passes through an opening in one side of the casing, and a brush 10 is carried by the inner end of said arm for contacting the plates 5 and 6. A link 11 consisting of two sections connected together by a sleeve 12, is adapted to be connected to a part of the steering mechanism such as a steering arm or a steering rod, with its other end pivotally connected to the outer end of the member 8 as shown at 13.

As shown in Fig. 4, the brush consists of a sleeve 14 of non-conducting material having a spring-pressed plunger 15 therein, and a socketed cap 16 having a metal part 17 in its socket for receiving one end of the spring 18 of the plunger. The metal part 60 is threaded in a metal sleeve 19 threaded in the outer end of the sleeve 14, and the outer part of the cap is formed of non-conducting material.

A metal collar 20 surrounds the sleeve 14 and the inner end of the rod 8 is threaded in this collar. A conductor 21 is connected to each of the plates 5 and 6 and leads to the signal means, and a supply conductor 22 is connected with the part 17.

From the foregoing it will be seen that when the automobile is going straight ahead, the plunger 15 of the brush means will be in engagement with the strip 7 so that the circuits are broken. When the vehicle makes a turn to either the right or left, the plunger will engage either the plates 5 and 6, and thus the circuit to the right signal means or the left signal means will be completed.

As will be seen, the device is very simple and there is very little wear on the parts thereof and the wear on the parts of the steering mechanism to which it is attached does not affect the working of the switch.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A switch of the class described comprising a casing, a block of non-conductive material located in the casing and having a raised central portion having parallel sides, a pair of contact plates fastened to the block having their adjacent ends contacting the sides of the raised part of the block, said contact plates diverging from the raised part of the block, an arm pivoted intermediate its ends to the casing and having a part extending into the casing and a brush carried by said part of the arm for engaging the contact plates when the arm is moved to either side of its neutral position, said brush engaging the raised part of the block when the arm is in neutral position.

In testimony whereof I affix my signature.

ALVA THOMPSON.